(12) United States Patent
Girerd

(10) Patent No.: US 6,513,518 B1
(45) Date of Patent: Feb. 4, 2003

(54) SOLAR CELL PANEL AND SOLAR ENERGY COLLECTING DEVICE

(75) Inventor: Stéphane Girerd, Lorris (FR)

(73) Assignee: Toutenkamion, Ladon (FR)

(*) Notice: Subject to any disclaimer, the term of this patent is extended or adjusted under 35 U.S.C. 154(b) by 0 days.

(21) Appl. No.: 09/674,030

(22) PCT Filed: Apr. 13, 1999

(86) PCT No.: PCT/FR99/00853

§ 371 (c)(1),
(2), (4) Date: Oct. 20, 2000

(87) PCT Pub. No.: WO99/54671

PCT Pub. Date: Oct. 28, 1999

(30) Foreign Application Priority Data

Apr. 22, 1998 (FR) .............................................. 98 05038

(51) Int. Cl.⁷ .................................................. F24J 2/26
(52) U.S. Cl. ...................... 126/563; 656/646; 656/676; 656/706
(58) Field of Search .................... 126/563, 656, 126/674, 676, 677, 705, 706, 709, 642, 646, 596

(56) References Cited

U.S. PATENT DOCUMENTS

| 3,952,725 A | * | 4/1976 | Edmondson ................. 126/659 |
| 4,060,071 A | * | 11/1977 | Chayet ....................... 126/656 |
| 4,072,262 A | | 2/1978 | Godrick et al. |
| 4,201,193 A | | 5/1980 | Ronc |
| 4,205,658 A | * | 6/1980 | Clark .......................... 126/563 |
| 4,261,332 A | | 4/1981 | Stewart |
| 4,381,763 A | | 5/1983 | Kahl |
| 4,538,592 A | * | 9/1985 | Sundquist .................... 126/706 |
| 4,644,935 A | | 2/1987 | Gallagher |
| 4,911,353 A | | 3/1990 | Deakin |
| 5,794,611 A | * | 8/1998 | Bottum et al. ............... 126/705 |

FOREIGN PATENT DOCUMENTS

| DE | 3110826 A1 | | 2/1982 | |
| EP | 992 A1 | * | 3/1979 | ................. 126/674 |
| FR | 2384215 | | 10/1978 | |
| FR | 2409463 | * | 6/1979 | ................. 126/648 |
| FR | 2428224 | | 1/1980 | |
| GB | 1467039 | | 3/1977 | |

\* cited by examiner

Primary Examiner—Sara Clarke
(74) Attorney, Agent, or Firm—Greer, Burns & Crain, Ltd.

(57) ABSTRACT

The invention concerns a panel comprising a front plate exposed to solar radiation and whereof the rear face is adjacent to an insulating layer, for example made of a synthetic foam. A conduit network for heat transferring fluid is inserted between the front plate and the insulating layer. A conducting lap such a fine and flexible aluminum grille is also inserted between the front plate and the heat insulating layer to collect the heat generated in the front plate and conduct it towards the conduit network. The invention is useful for collecting solar energy in the form of heat particularly in roofs.

27 Claims, 2 Drawing Sheets

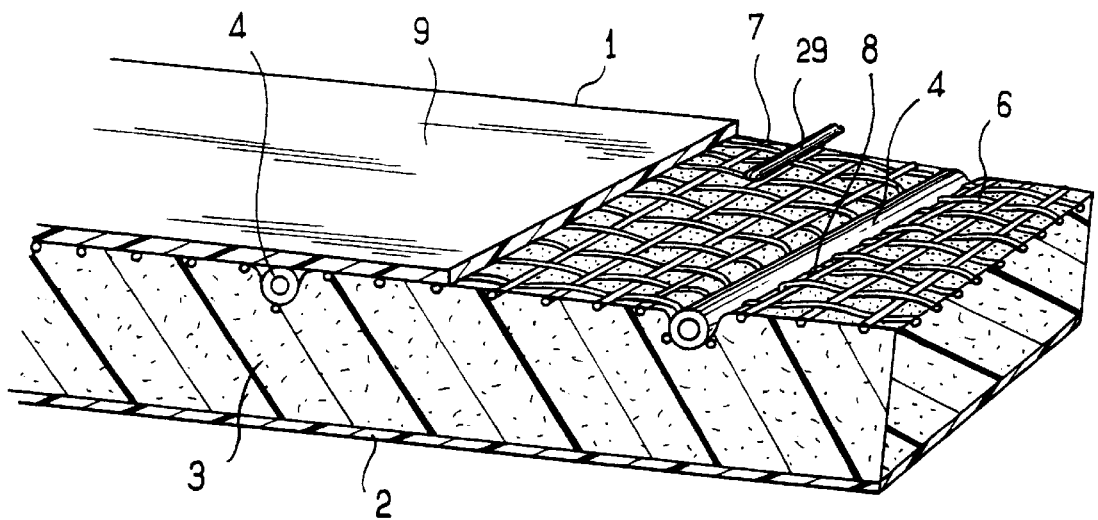
FIG_1
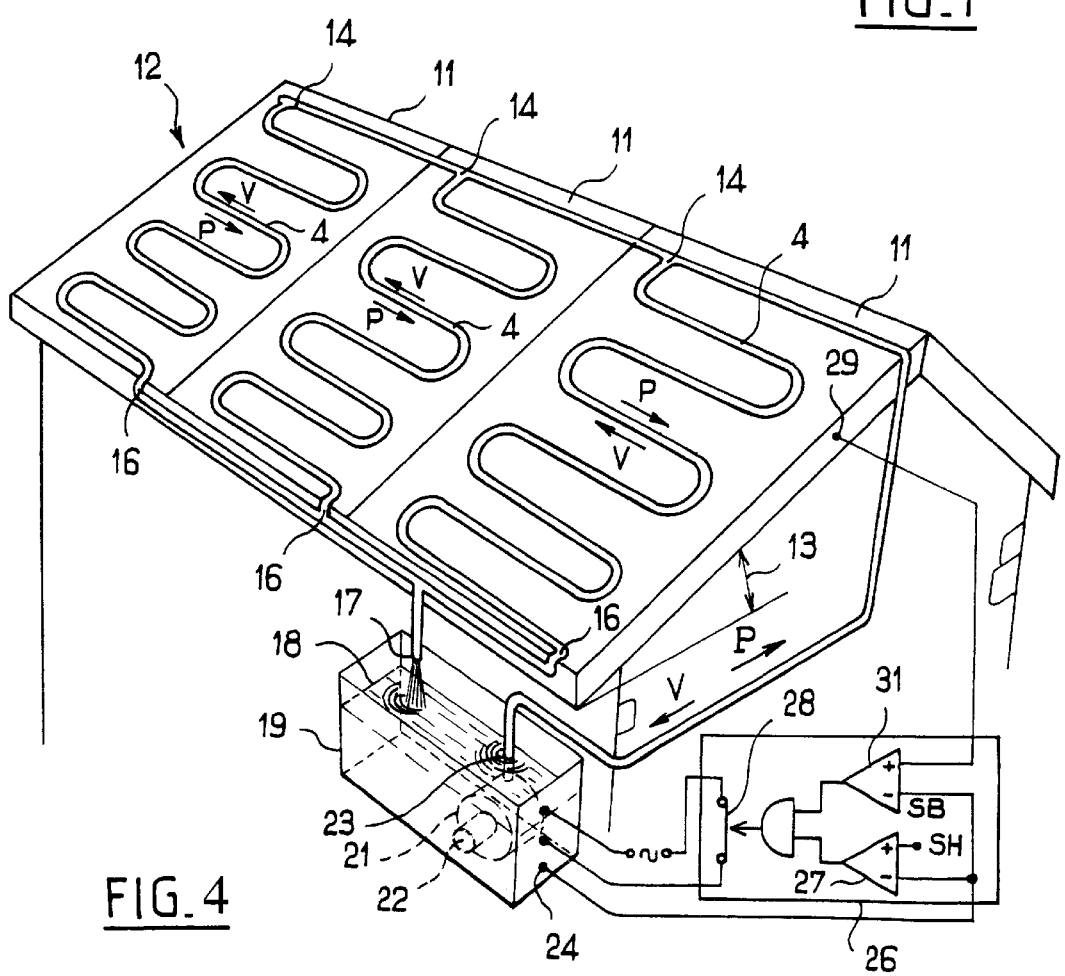
FIG_4

SOLAR CELL PANEL AND SOLAR ENERGY COLLECTING DEVICE

The present invention relates to a solar panel.

The present invention also relates to a device for collecting solar energy in thermal form.

The present invention further relates to a method for realizing the structural solar panel.

Solar panels integrating photo-voltaic cells are known. They are expensive, require elaborate production facilities and produce relatively modest amounts of energy.

Panels are also known which are designed to produce a greenhouse effect by transforming the solar radiation received on an outer face of the panel into thermal radiation emitted by the opposite face.

GB-A-1 467 039 describes a panel having on one face a tubular network for a heat-transfer fluid, and an aluminum sheet thermally linked to the copper tubular network. The whole is held against a thermally insulating layer by screwed profiled sections. The solar energy is collected in the form of an increase in temperature of the heat-transfer fluid.

According to FR-A-2 384 215 the screwed profiled sections are replaced by a front plate and the tubular network is an integral part of the thermally conductive sheet.

Such panels are expensive to realize and require a bearing structure. The sheet or other thermally conductive layer is not compatible with the realization of structural composite panels such as sandwich panels where a central core typically made of foam is sandwiched between two plates of preferably thermo-setting synthetic resin which are reinforced with a sheet of glass or synthetic, woven or non-woven fibres.

An aim of the present invention is to propose a panel for collecting solar energy which is particularly economical to produce and effective in energy-creating and mechanical terms, and allows easy installation.

Another aim of the present invention is to propose a device for collecting solar energy which is economical and effective.

According to a first aspect of the invention, the solar panel comprising:

a front plate situated on the side exposed to the sun;

a thermally insulating layer adjacent to a rear side or face of the front plate, facing away from exposure to the sun;

a tube bundle for the circulation of a heat-transfer fluid, this bundle being interposed between the front plate and the insulating layer; and a thermally conductive sheet interposed between the front plate and the thermally insulating layer and which is thermally linked to the front plate and to the tube bundle;

is characterized in that the thermally conductive sheet is permeable to an agent binding the frontal plate with the thermally insulating layer and forms an integral part of an interface stratifying the front plate with the thermally insulating layer.

A structural panel is thus realized where the thermally conductive sheet actually reinforces the stratification interface. The cost of production is not greatly increased compared with a standard structural panel and fitting is the same apart from the connection to a fluid circuit. In particular, the panel can be self-supporting and thus not require a bearing frame.

It has been shown that a particularly suitable thermally conductive sheet consists of a metal grille, preferably of aluminum, or of a sheet of thermally conductive fibres, in particular carbon fibres.

The panel is preferably of the sandwich type, the insulating layer being arranged between the said front plate and a rear plate.

It is advantageous that the tubular network is a flexible tube, for example of synthetic material, that is arranged in a sinusoidal duct formed in the insulating layer is to form a coil. It has been found that the tubular network did not need to be made of material that was thermally very conductive, since the collected heat is properly trapped and conveyed by the conductive sheet. It has proved very advantageous in this respect that the sheet extending substantially along the front plate forms housings for locally bypassing each element of the bundle by passing between the bundle and the insulating layer. Thus, each element of the tubular network receives heat, on the one hand directly from the front plate on the front face of the tube or tubes, and on the other hand via the sheet on the remainder of the circumference of the tube or tubes.

According to a second aspect of the invention, the device for collecting solar energy in thermal form is characterized in that it comprises:

a tank of heat-transfer fluid;

a pump having an inlet immersed in the heat-exchange fluid of the tank; and a panel incorporating a tube bundle for the heat-transfer fluid, the panel being arranged at an angle relative to the horizontal such that the tube bundle has an upper end connected to the outlet of the pump, and a lower end opening out freely above the level of fluid in the tank.

Such a device drains easily when it has stopped, through reversal of the flow. The reverse flow is then from the lower end to the upper end and from there into the tank through the pump. Such a drainage can take place through reversal of the direction of operation of the pump. Drainage is even automatic and spontaneous as soon as the pump stops on condition that the pump is of a type where the inlet and the outlet communicate with each other at least when the pump has stopped. This is typically a pump of the centrifuge type or other pump of the rotor-turbine type.

Thus the device according to the invention is particularly suitable for use with the solar panel housed in the roof. Moreover, the heat-exchange fluid can comprise water without this resulting in a risk of degradation through frost or limescale.

For preference:

the device for collecting solar energy comprises thermostatic means for interrupting the operation of the pump when a recorded temperature of use, such as for example the temperature of the heat-transfer fluid in the tank, exceeds an upper threshold value, and/or for interrupting the operation of the pump when the temperature of the front plate is below a lower threshold value.

means are provided to vary the lower threshold value in relation to a recorded temperature of use, such as for example the temperature of the heat-transfer fluid outside the tubular network and in particular in the tank.

the tank is a pool.

According to a third aspect of the invention, the method for realizing a panel according to the first aspect comprises: forming at least one duct in one face of a flat foam block, placing the conductive sheet on the said face of the block, placing a tubular network in the duct while the sheet forms housings copying the shape of the duct, then fixing a front plate on the said face by means of a structuration interface.

Other particular features and advantages of the invention will also emerge from the description below, relating to a non-limitative example.

In the attached drawings:

FIG. 1 is a view in section and perspective of a panel according to the invention;

FIG. 4 is a view of a collecting device according to the invention.

Figure 2:
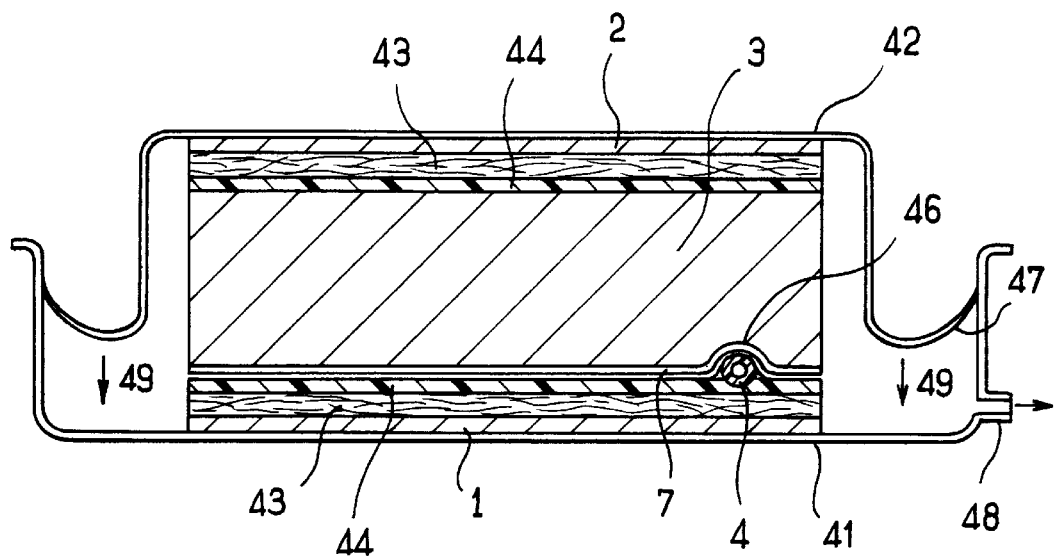
FIG. 2 is a view in cross-section illustrating a stage in the production process of a solar panel according to the invention.

In the example represented in FIG. 1, the solar panel is realized in the form of a sandwich panel comprising a front plate 1 intended to be exposed to radiation from the sun and a rear plate 2, both made of polyester reinforced with glass fibre. Interposed between the front plate 1 and the rear plate 2 is a thermally insulating layer 3, realized for example in polyurethane foam.

According to the invention, a tubular network 4 has been interposed between the front plate 1 and the insulating layer 3.

More particularly, the tubular network 4 is housed in corresponding recesses in the form of a channel 6 worked in the layer 3 on its face which is adjacent to the front plate 1.

According to a very advantageous particular feature, a thermally conductive sheet 7, realized in the form of a fine aluminum grille, has also been placed between the front plate 1 and the insulating layer 3. Such a grille is very flexible before its insertion into the panel.

The sheet 7 is thermally linked with the front plate 1 and with the tube bundle 4.

The sheet is in contact or quasi-contact with the rear face of the front plate in zones situated between the tube bundle 4, and forms housings 8 which follow the contour of the recesses 6 in order to locally bypass—or pass round—each tube of the bundle 4 by passing between the bundle 4 and the insulating layer 3.

In other words, the bundle 4 is arranged between the sheet 7 and the front plate 1. The bundle is heated from the front by the plate 1 and on all its other sides by the sheet 7.

To realize the panel represented in FIG. 1, a start can be made by sticking the tube bundle 4 against the front plate 1, then prefixing the sheet 7 against the same face of the front plate 1 and causing it to form bosses wherever elements of the tube bundle 4 are present.

The plates 1 and 2 are then placed in their desired relative position and the formation is caused, between them, of the polyurethane foam intended to constitute the insulating layer 3, in such a way that this layer traps the sheet 7 and the tube bundle 4 against the front plate 1, and fixes the two plates 1 and 2 one to the other.

According to another realization process, which is preferred, a block of foam intended to constitute the layer 3 is produced, at least one slot or duct intended to constitute the housing(s)6 for the network 4 is worked in one face of the block, the sheet 7 is fixed against this face of the block 3, the network 4 is put in place, then the front plate 1 is stuck on. The rear plate 2 can be fixed at any time after the production of the foam block. FIG. 2 illustrates in greater detail this second mode of production of the panel. A stack is placed between a mould 41 and a counter-mould 42, comprising, between the insulating layer 3 and each front plate 1, 2, a stratifying composition comprising a layer of glass or carbon fibres 43 in the form of a woven or non-woven sheet impregnated with a layer of thermo-setting resin 44. The plates 1 and 2 may be only an impermeabilizing "gel-coat" covering. As far as the front plate 1 is concerned, the layer 3 has been previously provided with the thermally conductive sheet 7 then the tubular network 4 in a previously formed duct 46. The sheet 7 is thus interposed between the wall of the duct 46 and the tube 4.

Figure 3:
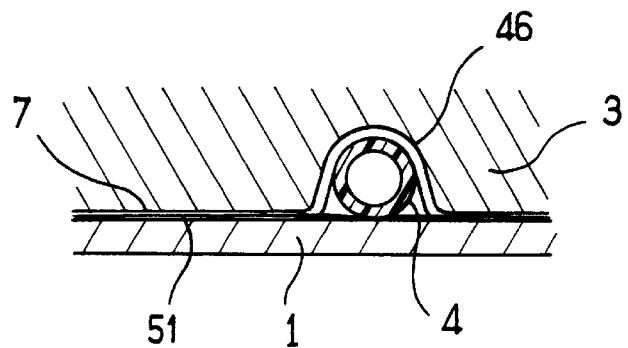
FIG. 3 is a view of a detail of a panel, in section.

The counter-mould 42 has a peripheral tightness lip 47 bearing against an inner lateral wall of the mould 41. The pressure in the space between the mould 41 and the counter-mould 42 is reduced through a suction orifice 48 of the mould 41, so that the counter-mould 42 drops into the mould 41 as shown by the arrows 49, thus compressing the stack, in particular the layers of fibres 43 and resin 44. These layers mix and flatten to form a stratification interface 51 (FIG. 3) between the layer 3 and each of the plates 1 and 2. A structural or self-bearing panel is thus obtained, that is to say one which can serve as a structural element in an edifice, for example a roof, without the need for a bearing frame. On the side where the front plate 1 is, the conductive sheet 7 is integrated with the structuring interface 51, forms one body with the veil of resin and fibres and, due to its structure being perforated, has allowed the resin to impregnate the foam of the layer 3. Thus the resin directly binds the plate 1 with the layer 3.

The front plate 1 is preferably covered on its front face 9 by a paint or other coating absorbing solar radiation and transforming it into heat with as reduced as possible a tendency to produce a reflected radiation.

The front plate 1 is preferably realized in a material having good thermal insulation properties in order to prevent the heat escaping through any bearing structures of the panel, such as metal frames or others. The polyester reinforced with glass fibres is suitable for constituting the front plate 1, giving it at once both the thermal insulation qualities which have been mentioned and the desirable mechanical resistance.

An example of dimensioning is the following:

thickness of the plates 1 and 2: ca. 1 to 2 mm;

thickness of the insulating layer 3: ca. 60 mm;

tube bundle made of natural and/or synthetic rubber, external diameter: 6 mm, internal diameter: 4 mm;

distance between the parallel elements of the tube bundle: ca. 50 mm.

In the example represented in FIG. 4, three modular panels 11 such as that illustrated in FIG. 1 are assembled side-by-side to form a roof face 12. The panels 11 form an angle 13 relative to the horizontal, for example 30 to 45° Each bundle 4 thus comprises an upper end 14 and a lower end 16 between which the bundle 4 comprises for each panel a single tube shaped as a serpentine coil formed of horizontal segments linked to each other by 180° bends, preferably substantially semi-circular. The lower ends 16 are connected to an exit 17 above the level 18 of a tank of heat-transfer fluid 19. A pump 21 is immersed in the tank 19, as is its inlet orifice 22. The outlet 23 of the pump is connected to the upper ends 14 of the tube bundles 4.

When the device is operating, the pump 21 removes heat-transfer fluid from the tank 19 and circulates it in the direction indicated by the arrows P to the upper ends 14 then through the bundles 4 as far as the lower ends 16 and from there through the exit 17 into the tank 19. In a manner not represented, the tank 19 can serve as a hot source for example for a central heating system.

The tank 19 can be very large and consist in particular of a swimming-pool. The water of the swimming-pool, which is to be heated, serves as heat-transfer fluid within the meaning of the invention.

The roof 12 can then be a shelter roof alongside the pool, or even, in a particularly preferred manner, a roof according to WO-A-97 20 114, mobile between a position hermetically covering the pool and a shelter position alongside this.

In the shelter position, the roof cooled by the removal of heat is more effective in protecting from the heat those persons found below it.

The pump 21 is typically of centrifuge type or other rotor-turbine type and more generally a type in which the inlet 22 and the outlet 23 are in communication with each other, at least when the pump has stopped. Thus, as soon as the pump is stopped, the whole system is drained though the siphon effect in the opposite direction (arrows V) to the direction of pumping, that is to say from the exit 17 as far as the lower ends 16 then through the bundles 4 as far as the upper ends 14 and from there through the outlet 23, the pump 21 and the inlet orifice 22. Thus the risk of freezing when the device has stopped is avoided and the heat-transfer fluid can quite simply comprise water.

Thermostatic means are provided to regulate the temperature of the water in the tank 19.

A thermostatic probe 24 is placed in thermal contact with the heat-transfer fluid in the tank 19. A control apparatus 26 receives the signal from the probe 24, and compares it with a predetermined upper threshold value SH in a comparator 27, and interrupts the operation of the pump 21 when the temperature recorded by the probe 24 is greater than the threshold value SH, by means of a switch 28. Excessive heating of the fluid is thus avoided, in particular if a swimming-pool is involved the water of which must not, in general, exceed a moderate temperature of 30 to 35° C.

A thermostatic probe 29 is placed in thermal contact with the front plate 1, and preferably with the thermally conductive sheet 7.

The control apparatus 26 receives the signal from the probe 29, compares it with a lower threshold value SB in a comparator 31, and interrupts the operation of the pump 21 by means of the switch 28 when the temperature recorded by the probe is lower than the predetermined lower threshold value, above the freezing point of the heat-transfer fluid.

Cooling of the heat-transfer liquid instead of heating thereof is thus avoided, and the freezing of the heat-transfer fluid is avoided.

In the embodiment represented, the lower threshold value SB, instead of being fixed, is equal to the temperature of the heat-transfer fluid recorded by the probe 24, the signal from which is sent to the negative terminal of the comparator 31.

Thus, the device operates only when it is actually capable of heating the water in the tank 19.

The invention is, of course, not limited to the examples that have been described and represented.

The realization in the form of autonomous panels such as those illustrated in FIG. 1 is not essential; the rear face of the thermally insulating layer 3 could for example be fixed against a bearing structure such as a wall, a roof plate.

It is preferred, but not essential, that the tube bundle 4 consists of a single tube arranged in a serpentine coil as represented in FIG. 4. It has in fact been found that the flow-rate thus obtained is sufficient to collect the solar energy, avoiding the costs and risks of leaks resulting from multiple welds or connections which result from multiple tube bundles assembled in parallel. For better thermal transfers, but at a higher cost, the bundle could be made of metal such as copper.

In the embodiment of FIG. 4, the use of modular panels is advantageous to permit prefabrication and easy transport to the installation site, but it is not essential.

It is not essential that the tank for collecting heat-transfer fluid below the exit 17 is the same as that in which the inlet orifice 22 of the pump lies. There can be two separate tanks, between which there extends for example a network using the hot fluid. The spontaneous drainage effect when the pump has stopped is achieved solely because the outlet orifice 17 is situated at a level above the level of the tank in which the intake orifice 22 lies.

Depending on the applications, the device can be used without regulation, or regulation can be used only relative to a lower threshold value or regulation only relative to an upper threshold value.

The probe 24 could, depending on the applications, be placed elsewhere, for example at the exit 17 from the network or in contact with a separate utilization structure of the tank 19.

The thermally conductive sheet 7 can be something other than a grille. It can for example be a sheet of heat-conducting fibres, woven or non-woven, in particular carbon fibres.

What is claimed is:

1. A solar panel, comprising:
   a front plate situated on side exposed to the sun;
   a thermally insulating layer adjacent to a rear side of the front plate, facing away from exposure to the sun;
   a tube bundle for the circulation of a heat-transfer fluid, said bundle being interposed between the front plate and the insulating layer; and
   a thermally conductive sheet interposed between the front plate and the thermally insulating layer and which is thermally linked to the front plate and to the tube bundle;
   said thermally conductive sheet is permeable to an agent binding the frontal plate with the thermally insulating layer and forms an integral part of an interface stratifying the front plate with the thermally insulating layer.

2. The panel according to claim 1, characterized in that the stratification interface comprises a sheet of, woven or non-woven.

3. The panel according to claim 1, characterized in that the binding agent is a thermosetting resin.

4. The panel according to claim 1, characterized in that the sheet extends substantially along said rear side of the front plate in zones situated between the tube bundle and forms recessed portions which locally accommodate each element of the tube and which are located between the bundle and the insulating layer.

5. The panel according to claim 4, characterized in that, where the sheet forms said recessed portions, said agent forms a stratification interface remainder which extends between the front plate and the tube bundle.

6. The panel according to claim 1, characterized in that the sheet is a metal grille.

7. The panel according to claim 6, characterized in that said grille is made of aluminum.

8. The panel according to claim 1, characterized in that the sheet is a sheet of fibers.

9. The panel according to claims 8, characterized in that said fibers are carbon fibers.

10. The panel according to claim 1, characterized in that the front plate is made of synthetic material.

11. The panel according to one of claims claim 1, characterized in that the insulating layer is a synthetic foam.

12. The panel according to claim 1, characterized in that the panel is of the sandwich type, the insulating layer being arranged between said front plate and a rear plate fixed to the insulating layer by a second stratification interface.

13. The panel according to claim 1, characterized in that the tube bundle comprises at least a tube arranged in a serpentine coil.

14. The panel according to claim 13, characterized in that the tube is a single tube comprising rectilinear parts connected amongst themselves by 180° bends.

15. The panel according to claim 1, characterized in that the tube bundle is made of flexible tube.

16. The panel according to claim 15, characterized in that said flexible tube is made of synthetic material.

17. A device for collecting solar energy in thermal form, comprising:

a tank of heat-transfer fluid;

a pump having an inlet immersed in the heat-exchange fluid of the tank and an outlet; and the panel according to claim 1 arranged at an angle relative to the horizontal such that the tube bundle has an upper end connected to the outlet of the pump and a lower end, opening out freely above the level of fluid in the tank.

18. The device for collecting solar energy according to claim 17, Characterized in that the panel is a roof panel.

19. The device for collecting solar energy according to claim 17 characterized in that the heat-transfer fluid is water.

20. The device for collecting solar energy according to claim 17, further including thermostatic means for interrupting the operation of the pump when a recorded temperature of use exceeds an upper threshold value.

21. The device for collecting solar energy according to claim 17, further including thermostatic means for interrupting the operation of the pump when the temperature of a front part of the panel is below a lower threshold value.

22. The device for collecting solar energy according to claim 17 characterized in that the tank is a swimming-pool.

23. A method of realizing the panel according to claim 1, characterized in that at least one duct is formed in one face of said thermally insulating layer comprised of a flat foam block, the thermally conductive sheet is placed on said face of the block, said tube bundle is placed in the duct while the sheet forms recessed portions copying the shape of the duct, then said front plate is fixed on said face by means of said stratification interface.

24. The method according to claim 23, characterized in that the duct is formed with a sinusoidal shape and a flexible tube which is formed by its position in the duct is used for the tubular network.

25. The method according to claim 23, characterized in that said method is started from an initially flat thermally conductive sheet having sufficient flexibility to form said recessed portions through the presence of the front plate keeping the tube network in the duct.

26. The device for collecting solar energy according to claim 17, characterized in that the tank is a swimming-pool.

27. The device for collecting solar energy according to claim 21, further including means for varying the lower threshold value in relation to a recorded temperature in use.

* * * * *